Oct. 19, 1965

D. GOOR 3,213,450

UNDESIRED SIGNAL CANCELLER

Filed Dec. 21, 1962

INVENTOR:
DAN GOOR,

BY Delbert P. Warner
HIS ATTORNEY.

Oct. 19, 1965    D. GOOR    3,213,450
UNDESIRED SIGNAL CANCELLER
Filed Dec. 21, 1962    3 Sheets-Sheet 2

INVENTOR:
DAN GOOR,

BY Delbert O. Warner
HIS ATTORNEY.

Oct. 19, 1965

D. GOOR 3,213,450

UNDESIRED SIGNAL CANCELLER

Filed Dec. 21, 1962

CHARACTERISTICS OF MTI

CHARACTERISTICS OF MTI IN SERIES WITH INVENTION

INVENTOR:
DAN GOOR,

BY Delbert P. Warner

HIS ATTORNEY.

United States Patent Office 3,213,450
Patented Oct. 19, 1965

3,213,450
UNDESIRED SIGNAL CANCELLER
Dan Goor, Camillus, N.Y., assignor to General Electric Company, a corporation of New York
Filed Dec. 21, 1962, Ser. No. 246,398
10 Claims. (Cl. 343—17.1)

The present invention relates to signal cancellers and in particular to cancellers for distinguishing undesired signals from desired signals and for cancelling the undesired signals.

Various means have been devised for cancelling undesired signals such as signals from weather, chaff or clutter in the returns from radar signals. Among these devices the simplest are those called Moving Target Indicators or MTI's which use relatively simple parallel circuits to introduce a time delay and phase shift in a first signal such that it can be used to directly cancel a succeeding signal. The chief difficulty with this simple MTI circuitry is that it is effective only in the cancellation of undesired signals reflected by fixed targets or targets of some selected low fixed velocity and multiples thereof and can not be readily adapted to the cancellation of signals from different targets moving at a variety of velocities. Other more sophisticated circuits have been devised to cancel undesired signals, but generally these other circuits have been adaptable only to particular radar processing equipment or they are unduly complex themselves. Many of these prior art devices also require a special relationships among the signals being processed, for example they must be used with processors operating at IF frequencies and can not be used at video frequencies. In addition, many prior art devices are dependent upon such a degree of phase coherence that they can not be used with moving platforms without elaborate correcting systems. Furthermore, most of the prior art devices depend on phase shift rather than true time delay to provide conditions among signals which will enable the cancellation of undesired target signals. This approach to cancellation is oftentimes of limited value, since phase shift is only a narrow band approximation of true time delay correction and it results in a reduction in bandwidth and consequently in the possible resolution of desired images which may be formed by a system. With the increased target velocities being experienced today, high resolution of images must be retained.

It is therefore an object of this invention to provide improved means which are simpler and more reliable than existing system for cancelling undesired signals from among desired signals, It is an additional object of this invention to provide a canceller for undesired signals which can be used with video processors, It is a further object of this invention to provide for the automatic cancellation of undesirable signals reflected from targets having many different velocities, It is another object of this invention to provide a canceller for undesired signals which compensates automatically for motion of a platform bearing the canceller, and It is yet another object of this invention to provide true time delays in undesired signal cancellers to provide improved resolution of images over prior art systems employing phase shift to approximate time delay.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1:
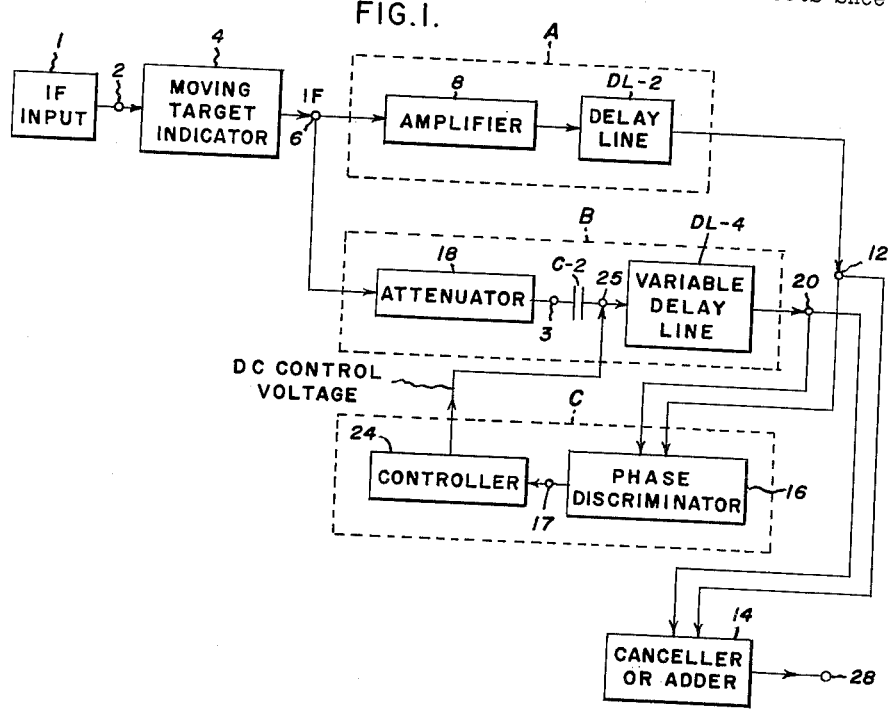
FIG. 1 is a block diagram showing an embodiment of the invention.
Figure 3:
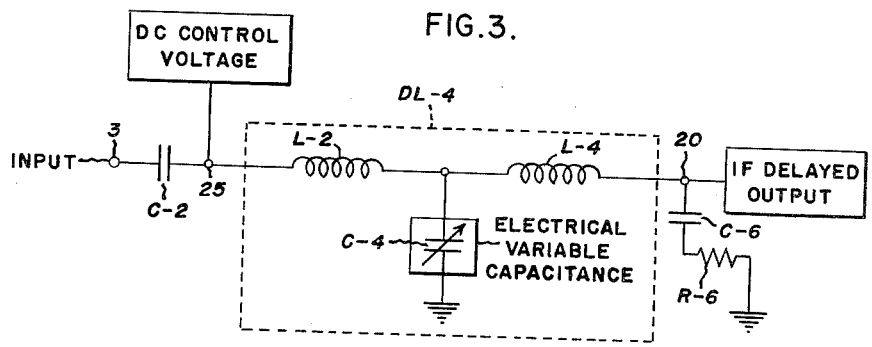
Figure 4:
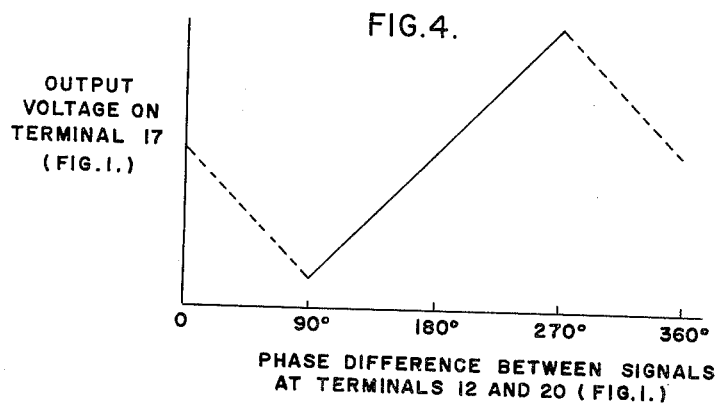
Figure 5:
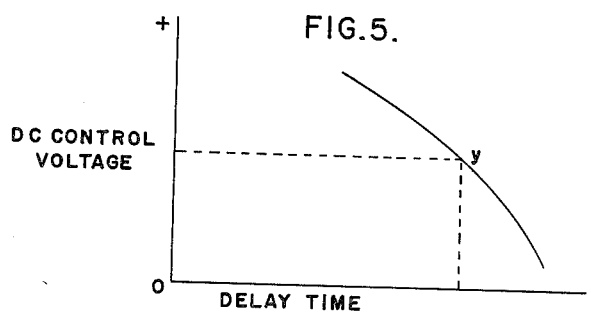
Figure 6:
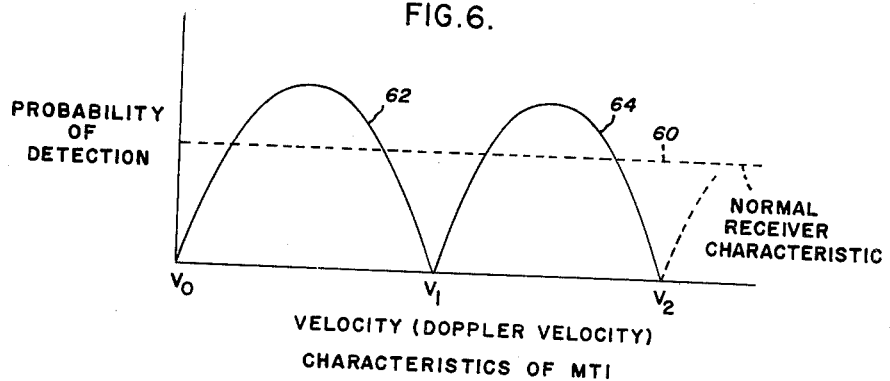
Figure 7:
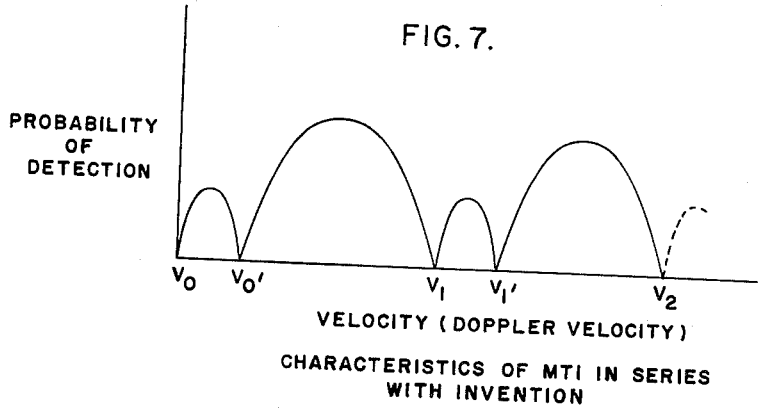

FIG. 3 is a block diagram to show the nature of an important element of the invention, FIG. 4 is a chart depicting certain relationship of signals appearing in apparatus such as is shown in FIG. 1, FIG. 5 is a chart showing the characteristics of a variable delay line such as is employed with the present invention, FIG. 6 is a chart depicting the characteristics of an MTI and comparing those characteristics with the characteristics of a radar receiver operating without an MTI filter, and FIG. 7 is a chart showing characteristics of an MTI followed by a circuit constructed in accordance with the present invention.

The invention may be described as relating to variable self-adjusting filters incorporating sensing functions and cancelling functions. The filters, through their sensing functions are capable of distinguishing between signals having relatively long time durations and signals having relatively short time durations. Having distinguished between these signals, the self-adjusting filters function as cancellers, adjusting cancelling means to cancel the long time duration signals, which are generally not desired. To accomplish these results the filters incorporate two parallel circuits. The first of these circuits contains a delay line to induce a time delay having a duration of one pulse repetition period and also includes means for producing a 180° phase shift. The second circuit attenuates signals received a pulse repetition period later and delivers them as undelayed signals. The delayed and undelayed signals are then added in order to cancel them and leave the short time signals. The residue signal, or signal left if cancellation is incomplete due to changes in the time between received signals occasioned by relative velocity between the reflecting target and the radar platform, is used to control the delay produced by a variable delay line in one or the other of the parallel circuits. The variable delay line is set in this way to vary the time delay so that more complete cancellation between the delayed and undelayed signals will be produced and the residue signal will be reduced to a minimum and the cancellation of undesired signals will be at a maximum.

Turning to FIG. 1, which shows a preferred embodiment of the present invention, we find an input terminal 2 to which an IF or intermediate signal is supplied from a radar receiver, represented by Block 1. This signal is supplied to a conventional Moving Target Indicator or MTI such as is indicated in Block 4. Characteristically, such MTI cancellers provide for the cancellation of radar signals reflected from fixed targets and from targets moving at cerain velocities which are called blind speeds. The remaining IF signals, with the signals from fixed targets and from targets moving at blind speeds removed, are than supplied to a terminal 6 from which point they are transmitted by parallel circuits, as shown by dashed Blocks A and B in FIG. 1. One branch of a canceller, as shown in Block A of FIG. 1, receives the signals from the terminal 6 passes them through an amplifier 8, and through a fixed delay line DL–2 to a terminal 12. The signals from the terminal 12 are tranmitted to a canceller or adder at 14 and also to a phase discriminator 16.

The signals from terminal 6 in FIG. 1 are also supplied through an attenuator 18, a condenser C–2 and a variable delay line DL–4, to a terminal 20. From terminal 20 the signals are supplied to the canceller or adder 14 and to the phase discriminator 16. The signals supplied from terminals 12 and 20 are compared in the phase discriminator 16 to determine any difference in the signals transmitted through the parallel circuits A and B of FIG. 1 and to supply an error signal proportional to the difference through a terminal 17 to an amplifier 24. The amplifier 24 includes means for supplying a D.C. potential proportional to the error signal which may be called a D.C. control voltage. This D.C. control voltage is supplied to the delay line DL–4 through a terminal 25.

The functioning of FIG. 1 is such that it provides for the cancellation of long-time duration signals having a duration longer than one pulse length in the canceller or adder 14 without cancelling certain desired signals having a time duration of one pulse length or less. In order to accomplish this, the portion of the circuit represented by the line driver or amplifier 8 and the delay DL–2 is used to provide a fixed delay in the received IF signal which is one pulse repetition period long and also to produce a 180° phase shift. It will be recognized that the delay line DL–2 is the component which provides this desired delay and that the amplifier 8 and any additional amplifiers merely assure that the signal amplitude and phase are appropriate. Another channel B of the circuit of FIG. 1 includes an attenuator 18, which corrects the amplitude of the signal appearing in the channel B to be equal to that appearing in channel A, and a condenser C–2 which is provided to prevent D.C. currents supplied at terminal 25 from passing into the attenuator 18. The delay line DL–4 is a variable delay line which may be of a commercially available type such as is shown briefly in FIG. 3.

All the signals supplied at terminals 12 and 20 are transmitted for further processing to the block made up of dashed lines C. The undesired signals present at 12 and 20 are generally pulses of greater duration than the pulses transmitted by the original radar transmitter, while desired signals generally consist of short pulses which have a duration about as long as the pulses transmitted by the radar transmitter. These pulses are mixed in the phase discriminator 16 and other components of the Block C. The time constant of the elements shown in Block C is such that short duration pulses from terminals 12 and 20 will not serve to cause the controller 24 to supply a D.C. control voltage to the delay line DL–4 soon enough to cause the desired short-time signals to have their delay affected. Consequently, the short-time pulses will be transmitted to the canceller or adder 14 where they will only partially cancel or not cancel at all and to the output terminal 28. Long-term signals from terminals 12 and 20, on the other hand, have such great time duration that they will cause the phase discriminator 16 to generate a voltage if they differ in relative phase by any quantity other than 180° and the resulting voltage will cause a change in the delay line DL–4 to shift the undelayed voltage enough to assure more complete cancellation in the canceller 14.

The relationships between the differences in phase between the input signals to the phase discriminator 16 and the output voltage of the phase discriminator are illustrated in FIG. 4. It will be recognized in FIG. 4 that regardless of whether the phase difference is greater than 90° or less than 270° a positive potential will be supplied at the output terminal 17 of the phase discriminator 16 and that a desired reference signal will appear at 17 when the phase difference is 180°. Normally, the range between 90° and 270° is expected to be a sufficient range, but if the shift in relative position of the signals is greater than 270° or less than 90° suitable circuits are available in the signal processing art to assure that usable signals can be supplied over the portions of the curve shown by dashed lines. The output voltage appearing on terminal 17 is supplied to a controller at 24 which serves as an isolator for the circuits and also provides a D.C. control voltage to delay line DL–4. The delay line DL–4 is of such a nature that it is responsive over its entire range to positive D.C. voltages as indicated in FIG. 4. At some potential midway between zero and the maximum voltage to which the delay line is responsive, labeled $y$ in FIG. 5, a reference delay time may be established and deviations above and below that reference value will cause the delay line to increase or decrease its time delay.

Figure 2:
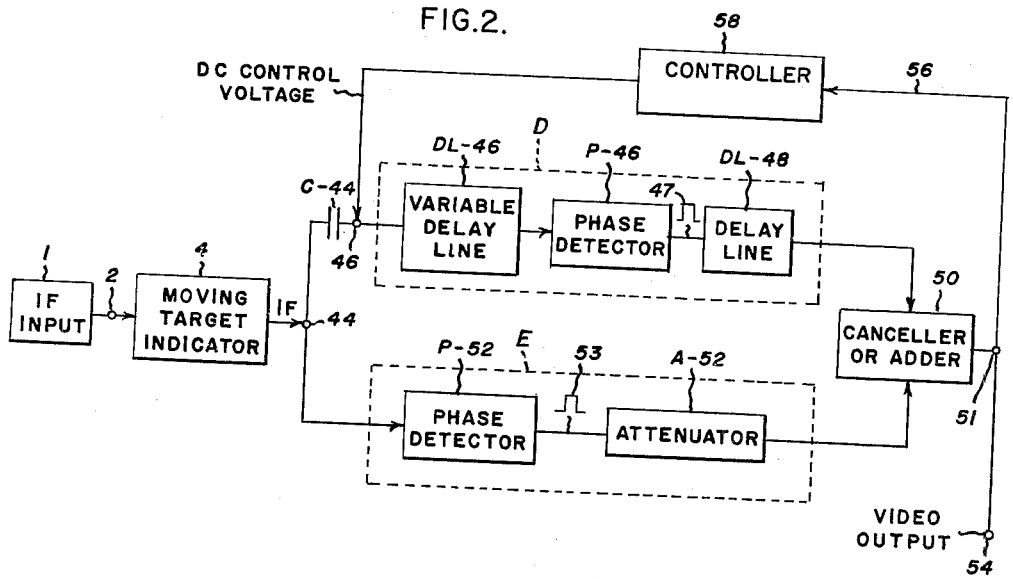
FIG. 2 is a block diagram showing another embodiment of the invention.

The present invention may also operate with a video canceller as shown in FIG. 2. In this case the IF signal will be supplied at a terminal 2 to an MTI such as 4 previously referred to in FIG. 1. The resulting IF signals, from which all long time signals from fixed targets have been removed by the MTI 4, are then supplied to terminal 44 for transmittal to two channels in FIG. 2 indicated by dashed-line blocks labeled D and E. The signals supplied to channel D are first supplied through a capacitor C–44 which isolates D.C. signals. The signals are then supplied to a terminal 46, to a variable delay line DL–46, to a phase detector P–46 which converts the IF signals to video signals, and to a delay line DL–48 which provides a delay of one pulse repetition period. The signal from the delay line DL–48 is then supplied to a canceller or subtractor at 50. Channel E of FIG. 2 consists of a phase detector P–52, which functions to convert the IF signal to video, and an attenuator A–52 connected to the subtractor or adder 50. The phase detectors P–52 and P–46 are identical in a preferred embodiment.

The phase detectors of the video canceller of FIG. 2, P–46 and P–52, function to remove any IF signals which were present in the circuit and supply video output signals as indicated roughly at 47 and 53 in FIG. 2. The video signal in channel D is delayed for one pulse repetition period by the delay line DL–48 and a corresponding signal is attenuated by the attenuator A–52 in channel E before they are supplied to the subtractor or adder at 50. The subtractor or adder at 50 is intended to subtract signals which are 180° out of phase from each other at the subtractor (or adder) 50 so that the output at terminal 54 of such signals will be zero. Since the long time signals are reflections from slowly moving targets of deep range extent such as clutter, chaff, and weather, they will not be exactly 180° out of phase at the subtractor (or adder) 50, and a residue signal (or remainder signal) will be left at terminal 51. In order to put the signals into a phase relationship such that they are exactly 180° out of phase the output of canceller 50 is supplied by a feedback loop from the subtractor 50, and terminal 51, through line 56 to a controller indicated at 58. The controller 58 will operate much in the manner of the feedback unit 24 of FIG. 1. The time constant of the circuitry in the controller 58 is such that the controller is not responsive to signals of narrow width such as one pulse width or less. Consequently the D.C. control voltage supplied at terminal 46 which controls the delay line DL–46 in the manner indicated for the delay line DL–4 in FIG. 1 only functions to change the delay for long-time signals so that they may be more full canceled in the subtractor 50 and has no affect on short-time signals.

FIG. 3 illustrates a section of a variable delay line DL–4 such as is indicated in FIG. 1 coupled between terminals 25 and 20. In FIG. 3 the signals to be delayed are applied at a terminal 3 and through a capacitor C–2 to the terminal 25. The terminal 25 also receives a D.C. control voltage which controls the amount of delay the line can provide. The combined signals supplied at terminal 25 appear across the coils L–2 and L–4 of the delay line DL–4 and across the electrical variable capacitance C–4. The output of DL–4 is supplied at terminal 20 which is shown connected to ground through capacitor C–6 and a resistor R–6. The output signal at terminal 20 will be the desired phase shifted or time positioned signal. As previously indicated, variable delay lines such as DL-4 are commercially available. A similar delay line may be employed at DL-46 in FIG. 2.

Turning now to FIG. 6, certain characteristics of a Moving Target Indicator of MTI are shown to provide a basis for better understanding of this invention. The curve in FIG. 6 is a plot of the probability of detection of a target or targets plotted with respect to velocity, or (since the "velocities" are really determined from signals affected by Doppler shift as well as actual velocity) Doppler velocity, as the independent variable. The horizontal dashed line 60 which is also labeled "normal receiver characteristic" represents the probability of detecting targets moving at various velocities with a radar system of the type used with the present invention. This however, does not allow for changes in system sensitivity caused by either a Moving Target Indicator or a variable canceller of the type disclosed by the present invention. The curves labeled 62 and 64 indicate the probability of detection of targets by use of radar employing an MTI canceller only. It will be observed that parts of the curves 62 and 64 rise above the normal receiver characteristics curve 60 which indicates that the MTI can actually increase the probability of receiving a particular target. It can also be seen that the MTI greatly decreases the probability of receiving other signals reflected from targets moving at particular velocities ($V_0$, $V_1$, and $V_2$), or in other words greatly increases the probability of cancelling undesired targets which are moving with particular velocities. This includes zero velocity as designated $V_0$ and various "blind" speeds as indicated at $V_1$ and $V_2$. It should be noted that points at $V_0$, $V_1$ and $V_2$, correspond to "filter notches" or points at which signals are not passed. It will be seen from FIG. 6 that an MTI such as is shown in 4 of FIG. 1 and FIG. 2 can be reasonably expected to cancel signals reflected from targets moving at selected velocities or "blind" speeds such as $V_1$ and $V_2$ and also to cancel signals from stationary targets.

Moving Target Indicators of the general type illustrated in Block 4 thus are able to cancel signals from certain undesired targets. However, they are not readily adaptable to the cancellation of signals from moving targets. The circuits shown in FIG. 1 and FIG. 2 provide flexibility which is missing in the MTI's. The nature of the cancellation which may be provided by the present invention as illustrated in FIG. 1 and FIG. 2 is indicated in FIG. 7 where a Moving Target Indicator or MTI is understood to be applied to provide the cancellation indicated at the notches located at $V_0$, $V_1$ and $V_2$ and thus to dispose of undesired signals from stationary targets. FIG. 7 also shows notches $V_0'$ and $V_1'$ which are determined by an embodiment of the present invention. The exact position of notch $V_0'$ for example is determined in accordance with the present invention, which provides that the position of the notch will automatically shift to cancel undesired signals.

It will be recognized that embodiments of the present invention, such as are shown in FIG. 1 and in FIG. 2, will provide for the cancellation of many undesired signals representing reflections from targets moving at different speeds. It is necessary to the accomplishment of this cancellation that the targets have large range extent and that the targets be separated in range sufficiently to reflect signals which will then be separated by an amount of time equivalent to or greater than the time constant of the cancelling circuits used in this invention. This time constant, it will be recalled, is a time period longer than one pulse width. In the event that it is necessary to cancel more than one undesirable signal reflected from targets moving at different velocities, but at ranges which are indistinguishable, then two or more cancellers such as are disclosed in preferred embodiments of this invention may be employed by connecting them in parallel.

Although particular embodiments of my invention have been described above, many modifications of the invention may be made. It is understood that I intend to cover by the appended claims all such modifications as fall within the true spirit and scope of the invention.

What I claim as new and desire to secure by Letters Patent of the United States is:

1. A signal canceller for cancelling undesired signals intermixed with desired signals comprising means for receiving said signals, means for delaying said signals to provide delayed signals arriving later in time by a fixed amount approximating a desired magnitude, means for providing said signals as undelayed signals, means for comparing said delayed signals with said undelayed signals to determine the difference between the actual time delay and a desired time delay, means for generating a correcting signal representative of said difference, means responsive to said correcting signal for bringing said actual time delay closer to said desired delay, and means for receiving said delayed signals and said undelayed signals with said corrected time delay and for cancelling said undesired signals.

2. A signal canceller for cancelling undesired signals intermixed with desired signals comprising means for receiving said signals and transmitting them through parallel lines, means in said parallel lines for providing a time delay between first signals transmitted by a first line and second signals transmitted by a second line, said time delay approximating a desired period which will permit undesired delayed signals to be used to cancel undesired undelayed signals, means for comparing said first signals and said second signals to determine how close the time difference between said signals approaches the desired period, means for generating a correcting signal proportional to the deviation in said time delay from said desired period, means responsive to said correcting signal for adjusting the time delay to more closely approach the desired period, and means for receiving said first signals and said second signals with said corrected time delay and for cancelling said undesired signals.

3. An undesired signal canceller comprising a first channel incorporating a fixed delay line and a variable delay line coupled to receive desired and undesired signals, a second channel coupled to receive said desired and undesired signals, means receiving output signals from each of said channels and detecting undesired signals present in both of said channels, means for generating a control signal according to differences in said undesired signals, an adder, and means applying said control signal to said variable delay line for adjusting the variable time delay to give the undesired signals a relationship such that they will cancel in the adder.

4. An undesired signal canceller comprising a first channel and a second channel, a fixed delay line in said first channel coupled to receive desired and undesired signals, a variable delay line in said second channel coupled to receive said desired and undesired signals, means coupling output signals from each of said channels to means for detecting undesired signals present in both of said channels and for generating control signals, an adder, and means applying said control signals to said variable delay line for adjusting the variable time delay to give the undesired signals a relationship such that they may be more fully cancelled in the adder.

5. An undesired signal canceller comprising a first channel incorporating a fixed delay line coupled to receive desired and undesired signals, a second channel incorporating a variable delay line coupled to receive said desired and undesired signals, means coupling output signals from each of said delay lines to a detector to detect undesired signals present in both of said channels and to generate a control signal in accordance with a particular relationship between said undesired signals, means applying said control signal to said variable delay line for adjusting the variable time delay to give the undesired signals in said second channel a relationship such that they will more fully cancel if added to undesired signals in said first channel, and an adder coupled to receive said desired and undesired signals to cancel said undesired signals and transmit said desired signals.

6. An undesired signal eliminator comprising a first channel and a second channel coupled between a common input terminal and an adder, a fixed delay line in said first channel coupled to receive desired and undesired signals, a variable delay line in one of said channels coupled to receive said desired and undesired signals, means coupling output signals from each of said channels to a detector to detect the phase relationships between undesired signals present in both of said channels and to generate a control signal proportional to the difference in said phase relationships between signals, means for applying said control signal to said variable delay line for adjusting the variable time delay to place the undesired signals into a closer phase relationship so as to reduce the magnitude of said phase difference to a minimum and thus to enable said adder to cancel said undesired signals.

7. An undesired signal eliminator comprising a first channel and a second channel coupled between a common input terminal and an adder, a fixed delay line and a variable delay line in said first channel coupled to receive desired and undesired signals, a second channel coupled to receive said desired and undesired signals, means coupling output signals from each of said channels to a detector to detect the phase relationships between undesired signals present in both of said channels and to generate a control signal proportional to the difference in said phase relationships between signals, means for applying said control signal to said variable delay line for adjusting the variable time delay to give the undesired signals a phase relationship such as to reduce the magnitude of said phase differences to a minimum and thus to enable said adder to cancel said undesired signals.

8. An undesired signal canceller comprising first and second channels for receiving desired and undesired signals composed of reflections of transmitted radar pulses where said transmitted radar pulses have fixed pulse repetition rates, said desired signals consisting of reflected pulses of relatively short duration—usually only as long as a transmitted pulse, said undesired signals consisting of reflected pulses of relatively long duration—usually as long as two or more transmitted pulses, said first channel including fixed and variable time delay means for delaying received signals by a time period equal to the time period between the transmitted radar pulses, said first channel incorporating means to shift the phase of said delayed signals by 180° and to provide the phase shifted and time delayed signal to a first terminal, said second channel providing output signals to a second terminal, means coupled to said first and second terminals for sensing phase relationships between signals on said terminals and for generating a control signal to change the delay time of said variable delay line when said phase relationships are not such as to cause the cancellation of undesired signals, and means coupled to said first and second terminals to receive and cancel said undesired signals and transmit said desired signals.

9. An undesired signal canceller comprising first and second channels for receiving desired and undesired signals composed of reflections of transmitted radar pulses where said transmitted radar pulses have fixed pulse repetition rates, said desired signals consisting of reflected pulses of relatively short duration—usually only as long as a transmitted pulse, said undesired signals consisting of reflected pulses of relatively long duration—usually as long as two or more transmitted pulses, said first channel including time delay means for delaying received signals by a time period equal to the time period between the transmitted radar pulses, said first channel providing delayed signals to a first terminal, said second channel incorporating a variable delay line capable of introducing varoius time delays to said desired and undesired signals in response to control signals, said second channel providing output signals to a second terminal, means including a discriminator coupled to said first and second terminals for sensing the relationships between signals on said terminals and for generating a control signal to change the delay time of said variable delay line when said relationships are not such as to cause the cancellation of undesired signals, and means coupled to said first and second terminals to receive and cancel said undesired signals and transmit said desired signals.

10. An undesired signal canceller comprising first and second channels for receiving desired and undesired signals composed of reflections of transmitted radar pulses where said transmitted radar pulses have fixed pulse repetition rates, said desired signals consisting of reflected pulses of relatively short duration—usually only as long as a transmitted pulse, said undesired signals consisting of reflected pulses of relatively long duration—usually as long as two or more transmitted pulses, said first channel including time delay, means for delaying received signals by a time period equal to the time period between the transmitted radar pulses, said first channel incorporating means to shift the phase of said delayed signals by 180° and to provide the phase shifted and time delayed signal to a first terminal, said second channel incorporating a variable delay line capable of introducing various time delays to said desired and undesired signals in response to control signals, said second channel providing output signals to a second terminal, means including a phase discriminator coupled to said first and second terminals for sensing the phase relationship between signals on said terminals and for generating a control signal to change the delay time of said variable delay line when said phase relationships are not such as to cause the cancellation of undesired signals, and means coupled to said first and second terminals to receive and cancel said undesired signals and transmit said desired signals.

References Cited by the Examiner
UNITED STATES PATENTS

| | | | |
|---|---|---|---|
| 2,580,148 | 12/51 | Wirkler | 343—100.7 |
| 2,866,373 | 12/58 | Doyle | 343—100.7 |

CHESTER L. JUSTUS, *Primary Examiner.*